United States Patent [19]
Hughes

[11] Patent Number: 5,000,565
[45] Date of Patent: Mar. 19, 1991

[54] OPTICAL RANGERFINDER WITH THROUGH THE VIEWFINDER READOUT

[75] Inventor: Thomas E. Hughes, Canandaigua, N.Y.

[73] Assignee: Crosman Corporation, Bloomfield, N.Y.

[21] Appl. No.: 442,005

[22] Filed: Nov. 28, 1989

[51] Int. Cl.[5] ............................................. G01C 3/12
[52] U.S. Cl. .................................................... 356/17
[58] Field of Search ...................... 356/16, 17, 18, 19, 356/142

[56] References Cited

U.S. PATENT DOCUMENTS

| | | | |
|---|---|---|---|
| D. 256,338 | 8/1980 | Kester | D10/70 |
| 1,283,943 | 11/1918 | Sperry | 356/17 |
| 1,905,485 | 4/1933 | Mihalyi | 356/17 |
| 2,058,484 | 10/1936 | Mihalyi | 356/17 |
| 3,216,309 | 11/1965 | Hartmeister | 356/17 |
| 3,614,228 | 10/1971 | Lyon | 356/17 |
| 3,817,621 | 6/1974 | Kester | 356/17 |
| 3,923,396 | 12/1975 | Ewald | 356/17 |
| 4,428,668 | 1/1984 | Redington | 356/17 |

Primary Examiner—Richard A. Rosenberger

[57] ABSTRACT

A rangefinder includes a housing, an eyepiece, and two spaced optical elements which provide a distance readout by optical triangulation. A through the viewfinder distance is provided by a distance scale which is mounted on an adjusting shaft for moving one of the optical elements in a pivotal manner relative to the other optical element. When a remote object is viewed through the eyepiece, two images of the remote object are projected into the eyepiece by the optical elements, and the adjusting shaft is rotated to bring the two images into coincidence. The angular position of the distance scale can be calibrated relative to the movable optical element by a clutch which disengages the adjusting shaft from the movable optical element to permit the distance scale to be rotated without moving the movable optical element.

10 Claims, 5 Drawing Sheets

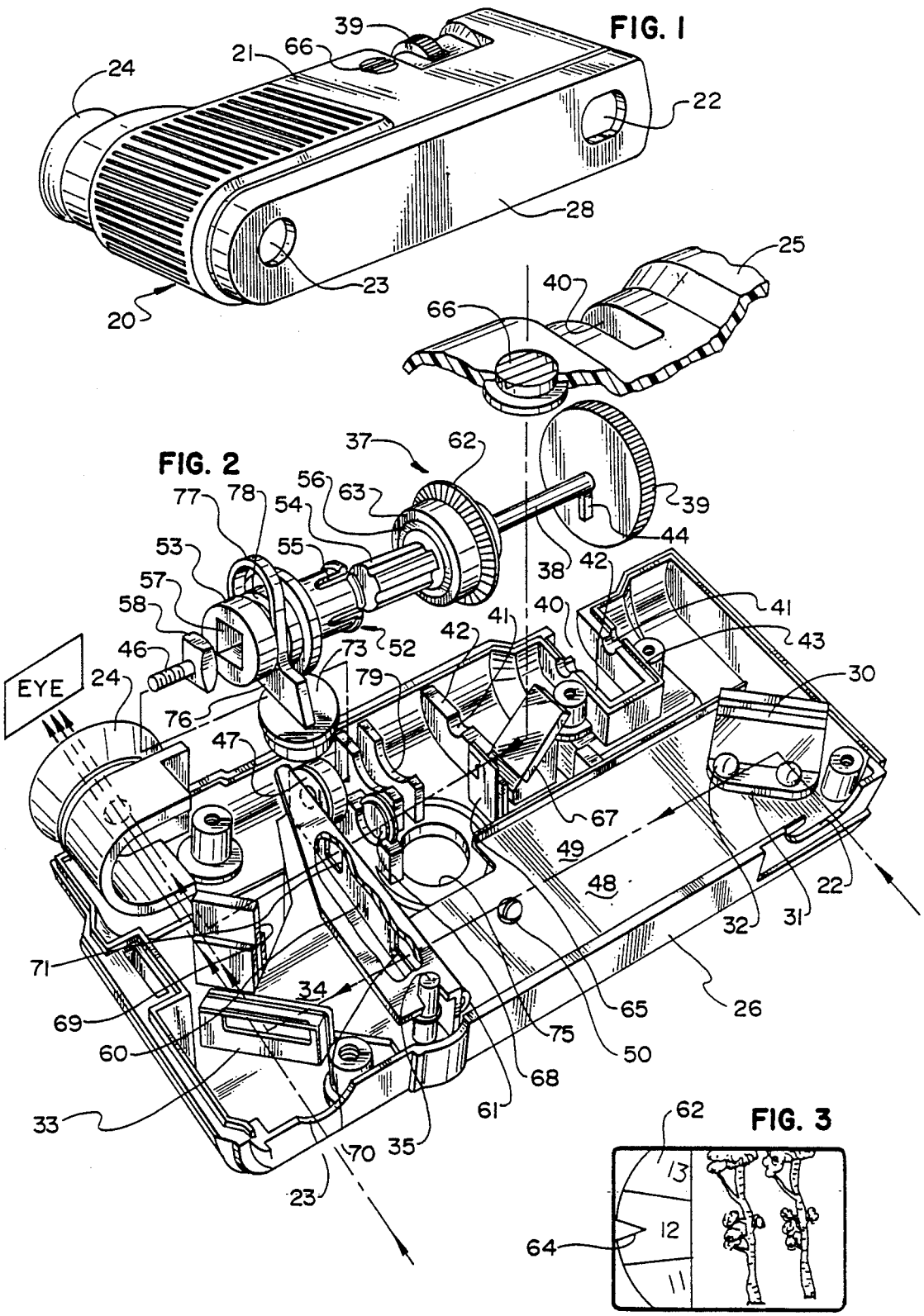

OPTICAL RANGERFINDER WITH THROUGH THE VIEWFINDER READOUT

BACKGROUND

This invention relates to optical rangefinders, and, more particularly, to an optical rangefinder with a distance scale which is read through the viewfinder and a system for adjusting or calibrating the scale.

Rangefinders which operate on the principal of optical triangulation are well known. For example, U.S. Pat. No. 3,817,621 describes an optical rangefinder which includes an eyepiece in the rear of a housing and two spaced optical elements in the front of the housing for projecting images from a remote object to the eyepiece. One of the optical elements is a beamsplitter which permits some of the light from the remote object to pass directly to the eyepiece and reflects the remainder of the light. The other optical element is a mirror which reflects light from the remote object to the beamsplitter where some of the light is reflected to the eyepiece. One of the optical elements is adjusted in a pivotal manner relative to the other until the two images are coincident, and a distance scale which is operatively connected to the adjusting mechanism provides a readout of the distance of the remote object. However, the distance scale is read through a separate window in the housing, and the user cannot read the distance scale through the viewfinder.

U.S Pat. No. 2,058,484 describes a rangefinder in which a distance scale is mounted on the indirect window and moves with the adjusting mechanism. Light from the remote object and the scale is reflected simultaneously from the indirect window to the eyepiece, and there is no calibration mechanism which permits the scale to be calibrated in order to provide accurate readings.

SUMMARY OF THE INVENTION

The invention provides a rangefinder with a distance scale which is read through the viewfinder. The scale is mounted on an adjusting shaft which extends perpendicularly to the axis of the eyepiece, and the image from the scale is reflected to the eyepiece separately from the two images of the remote object. A clutch is operatively connected to the adjusting shaft for permitting the shaft and the scale to be rotated without moving the movable optical element, thereby permitting the scale to be calibrated relative to the movable optical element. The user can make distance measurements without removing the rangefinder from his eye, and he can make multiple measurements quickly and with a minimum amount of movement.

DESCRIPTION OF THE DRAWING

The invention will be explained in conjunction with an illustrative embodiment shown in the accompanying drawing, in which FIG. 1 is a perspective view of a rangefinder formed in accordance with the invention;

FIG. 2 is an exploded fragmentary perspective view of the rangefinder;

FIG. 3 is a simulated view of what may be seen through the eyepiece of the rangefinder;

DESCRIPTION OF SPECIFIC EMBODIMENT

Figure 4:
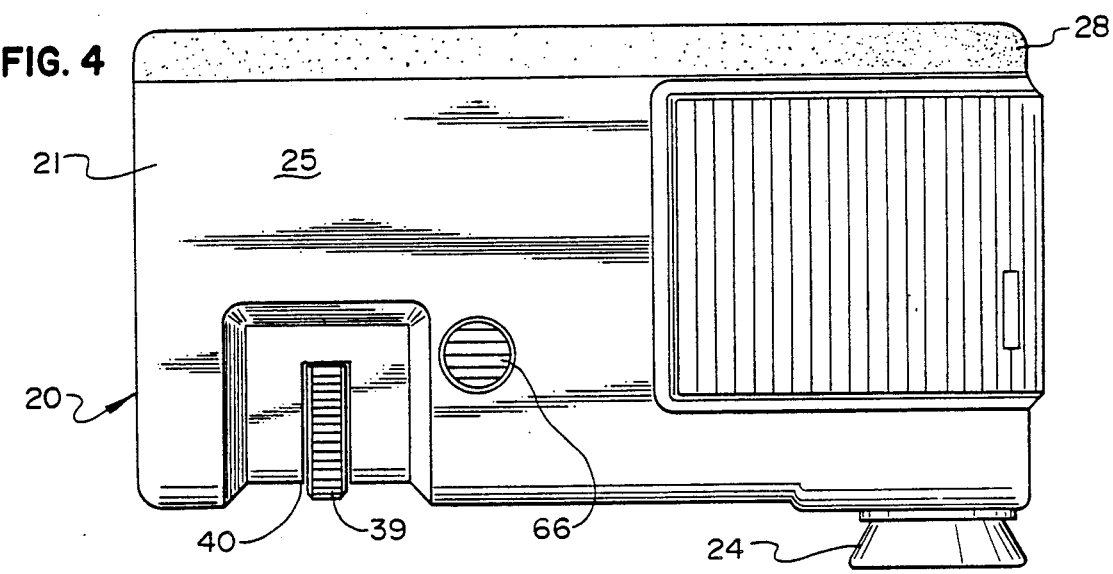
FIG. 4 is a top plan view of the rangefinder.
Figure 5:
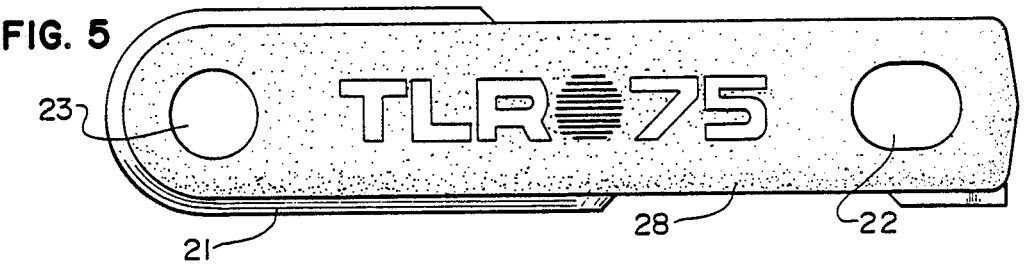
FIG. 5 is a front view of the rangefinder.
Figure 6:
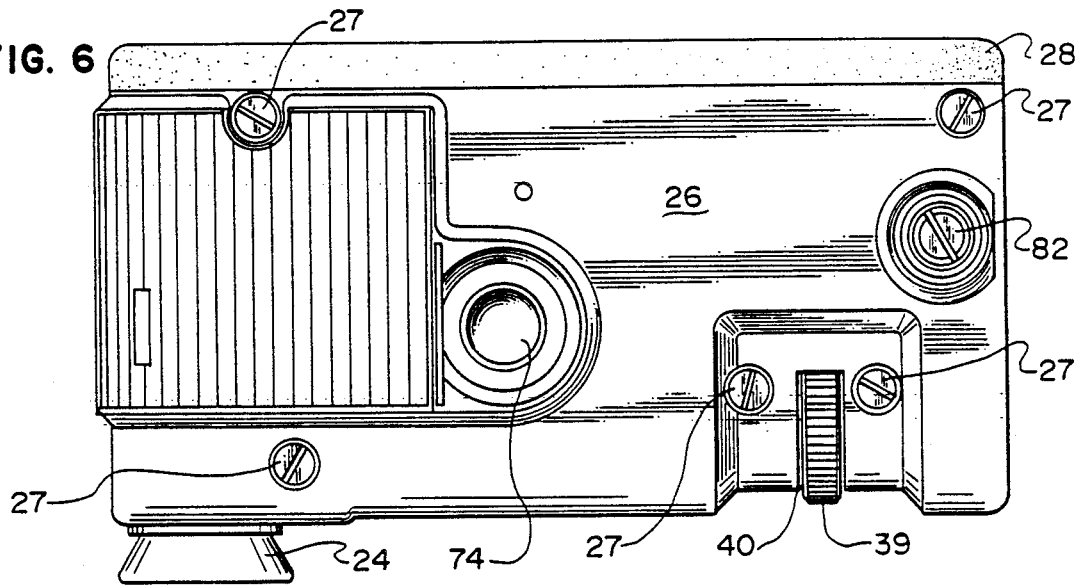
FIG. 6 is a bottom plan view of the rangefinder.
Figure 7:
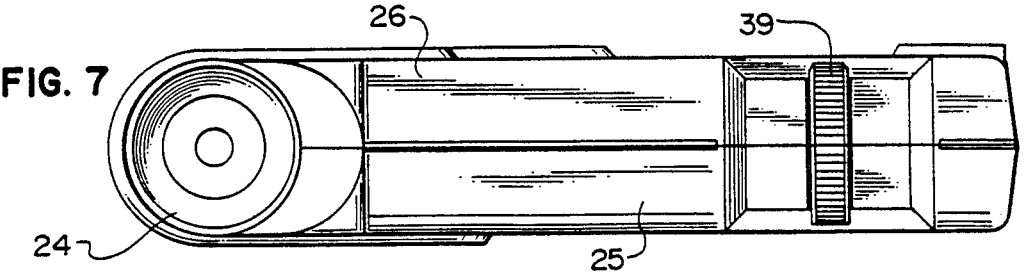
FIG. 7 is a rear view of the rangefinder.
Figure 8:
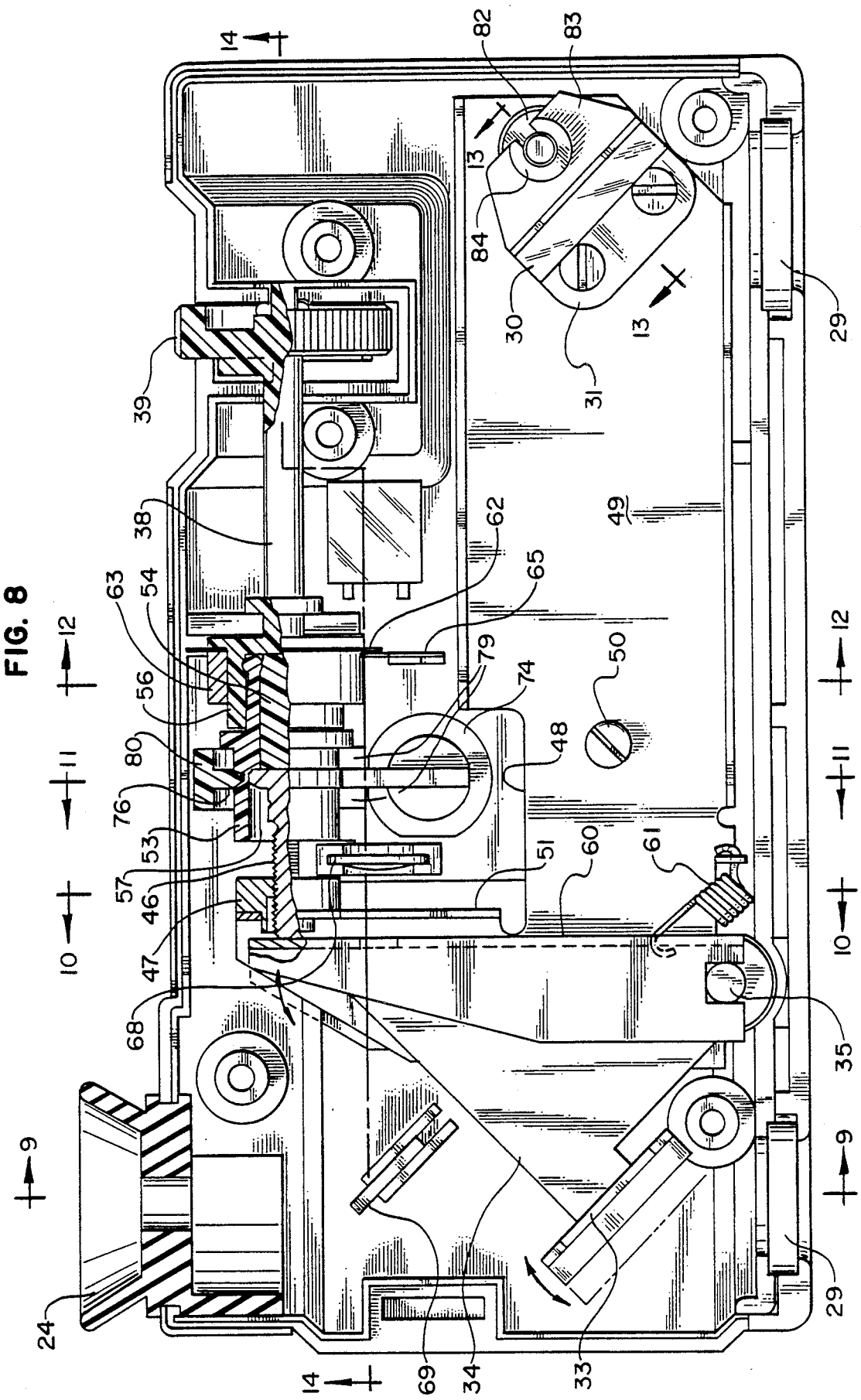
FIG. 8 is a flat plan view, partially broken away, of the bottom half of the rangefinder.
Figure 9:
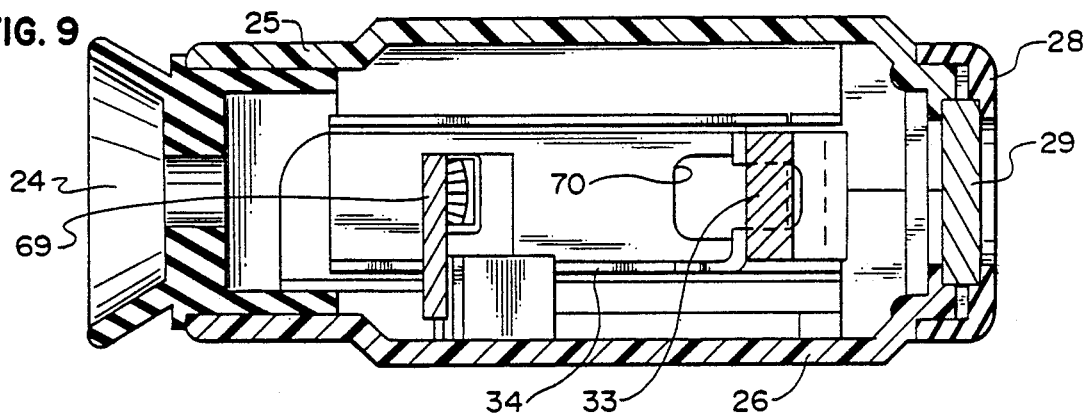
FIG. 9 is a sectional view taken along the line 9—9 of FIG. 8.

A rangefinder 20 includes a housing 21 having a pair of front openings 22 and 23 and an eyepiece 24 in the rear of the housing. The housing is formed by top and bottom halves 25 and 26 which are fastened together by screws 27 (FIG. 6). A rubber bezel or cover 28 extends across the front of the housing and holds windows 29 (FIGS. 8 and 9) for the front openings.

Referring to FIG. 2, a mirror 30 is positioned behind the front opening 22. The mirror is mounted on a frame plate as by an L-shaped bracket 31 and screws 32.

A beamsplitter 33 is positioned behind the front opening 23. The beamsplitter is mounted on a generally triangular arm 34 which is pivotally mounted on a pin 35. The beamsplitter is a conventional dichroic device which reflects a portion of the light from the mirror 30, for example yellow light, to the eyepiece 24. The beamsplitter also allows a portion of the light which enters the front opening 23, for example blue light, to pass to the eyepiece.

When a remote object is viewed through the eyepiece, a double image of the object is seen. One image of the object is reflected to the eyepiece by the mirror 30 and the beamsplitter 33. A second image of the object is viewed directly through the beamsplitter in the front window 23. The two images can be brought into coincidence by rotating the beamsplitter 33 about pivot 35 relative to the mirror 30.

Figure 14:
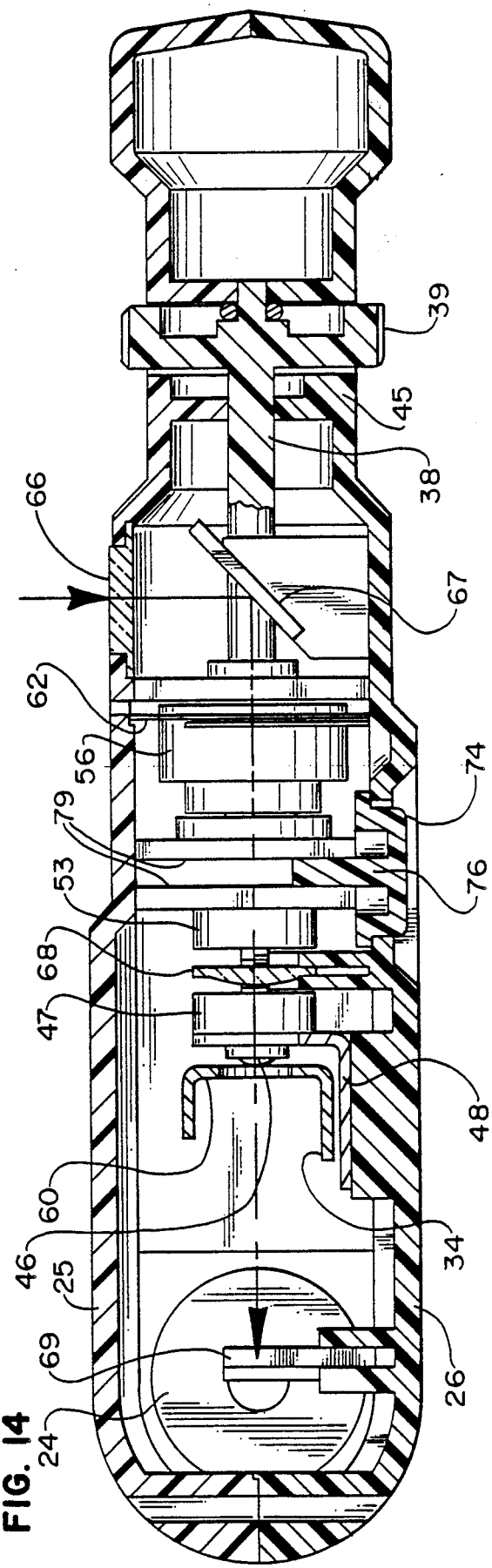
FIG. 14 is a sectional view taken along the line 14—14 of FIG. 8.

The position of the beamsplitter is controlled by an adjusting mechanism 37. The adjusting mechanism includes a shaft 38 which is rotatably mounted in the bottom housing for rotation about an axis which extends perpendicularly to the pivot axis of the beamsplitter 33 and perpendicularly to the light path into the eyepiece 24. A knob 39 is mounted on the end of the shaft and extends through slots 40 in the top and bottom housings so that the knob and adjusting shaft can be rotated by the user. The shaft is rotatably supported in semicircular grooves 41 and walls 42, 43, and 44 in the bottom housing and in corresponding walls in the top housing. A rib 44 extends radially along the knob 39 and is engageable with a stop shoulder 45 (FIG. 14) to limit rotation of the knob to one revolution.

An adjusting screw 46 is threadedly engaged with a nut 47 which is mounted on a metal frame 48 which also supports the pivot pin 35. The frame includes a flat base 49 which is attached to the bottom housing by a screw 50 and a vertical wall 51 (FIG. 8) on which the nut 47 is mounted. The adjusting screw 46 is operatively connected to the adjusting shaft 38 by a clutch assembly 52 so that rotation of the shaft causes rotation of the screw.

The clutch assembly includes a cylinder 53 and an elastomeric plug 54. One end of the cylinder is provided with longitudinal slots 55, and the slotted end is sized to fit with an interference fit inside a cylindrical cup 56 on the end of the adjusting shaft 38. The elastic and compressible plug 54 is received inside of the slotted end of the clutch cylinder 53 and resiliently biases the slotted end against the inside wall of the cup 56. The other end of the clutch cylinder 53 is provided with a square bore 57 which slidably receives the square head 58 of the adjusting screw 46.

The frictional force which is exerted by the slotted end of the clutch cylinder 53 and the plug 54 against the cup 56 causes the clutch cylinder 53 to rotate with the adjusting shaft 38. Rotation of the clutch cylinder 53 rotates the adjusting screw 46, and the screw advances or retracts within the nut 47.

The end of the adjusting screw 46 bears against a vertical plate 60 which extends upwardly from the pivoting arm 34 which supports the beamsplitter 33. The pivoting arm is maintained in contact with the adjusting screw by a spring 61, one end of which is connected to the pivoting arm and the other end of which is connected to the frame 48. As the adjusting screw advances or retracts, the arm 34 and the beamsplitter 33 pivot relative to the stationary mirror 30. The adjusting knob is rotated until the two images of the remote object merge and become coincident.

Figure 12:
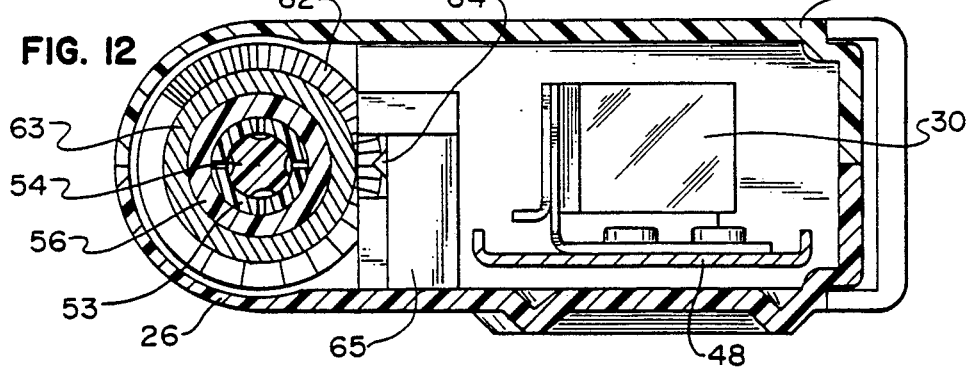
FIG. 12 is a sectional view taken along the line 12—12 of FIG. 8.

A distance scale is provided by a transparent disc 62 which is mounted on the cylindrical cup 56 which is attached to the adjusting shaft 38. The scale is retained on the cup 56 by a sleeve 63. The scale is printed with numbers and radial graduations (FIG. 3) which represent the distance to the remote object when the two images are coincident. A pointer or mark 64 is provided on a plate 65 (FIGS. 2, 8, and 12) which is mounted on the housing adjacent the scale. The pointer cooperates with the scale to provide a readout of the distance.

Figure 10:
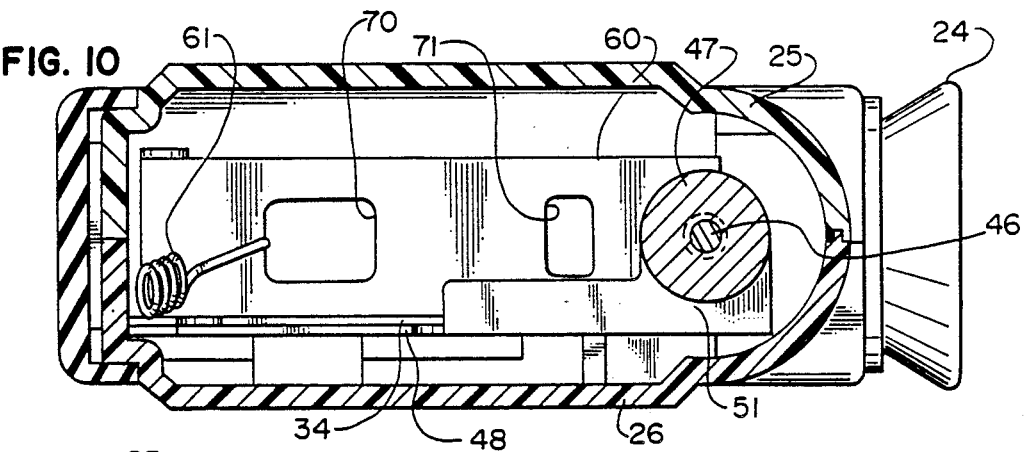
FIG. 10 is a sectional view taken along the line 10—10 of FIG. 8.

The distance scale 62 is illuminated by light which passes through a light diffusing window 66 in the top housing. The light is reflected through the scale by a mirror 67 and is focused by a lens 68. The image of the scale is reflected into the eyepiece 24 by a mirror 69 so that the user views the remote object and the scale simultaneously as shown in FIG. 3. A pair of windows 70 and 71 (FIGS. 2 and 10) are provided in the vertical wall 60 of the pivoting arm 34 to pass light from mirror 30 to beam splitter 33 and from mirrors 67 to mirror 69.

Figure 11:
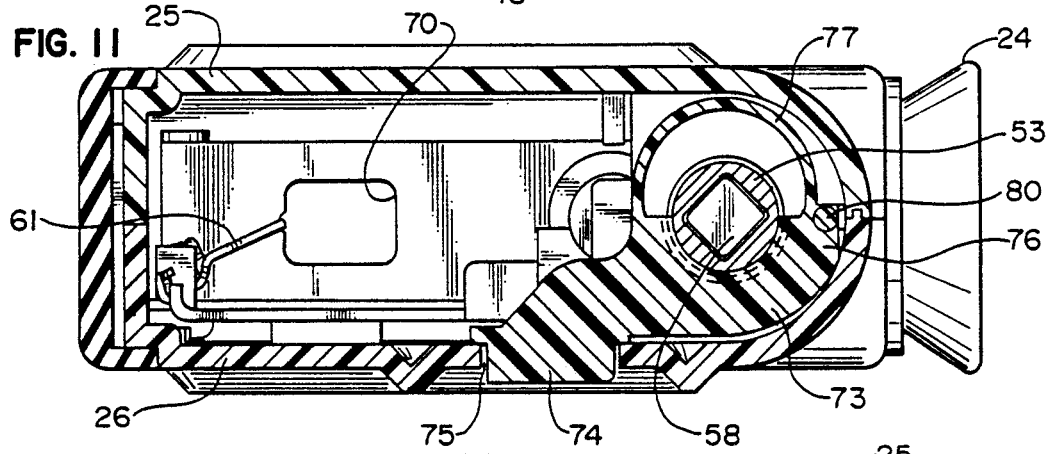
FIG. 11 is a sectional view taken along the line 11—11 of FIG. 8.

The clutch assembly 52 (FIG. 2) permits the angular position of the scale to be adjusted relative to the adjusting screw 46. A calibrator button 73 (see also FIG. 11) surrounds the clutch cylinder 53 and includes a pushbutton portion 74 which extends through an opening 75 in the bottom housing. The calibrator button includes a semicircular brake rib 76 which is positioned around the bottom half of the clutch cylinder 53 and a resilient hoop portion 77 which extends upwardly from the rib 76. The rib 76 is positioned within an annular groove 78 in the surface of the clutch cylinder 53, and the top of the U-shaped hoop 77 engages the top housing 25 so that the rib 76 is normally maintained out of contact with the clutch cylinder. The rib 76 is slidably positioned between a pair of vertical walls 79 (FIG. 2) on the bottom housing which rotatably support the clutch cylinder 53, and a pair of pivot pins 80 (FIG. 8) are molded on the calibrator button and are pivotally supported by the walls 79.

The distance readout of the scale 62 may be calibrated after the rangefinder is assembled or at any other time if for some reason the distance readout is not accurate. The user views an object at a known distance from the viewfinder and rotates the adjusting knob 39 until the two images of the object are coincident. If the distance scale provides an incorrect readout, the pushbutton 74 of the calibrator button is pressed inwardly and held. The resilient hoop portion 77 of the calibrator button flexes and allows the rib brake 76 to move into engagement with the clutch cylinder 53. The force exerted on the rib by the finger applies sufficient frictional force on the clutch cylinder to overcome the frictional force which is exerted by the clutch cylinder and the elastic plug 54 on the cylindrical cup 56 of the adjusting shaft 38. Accordingly, when the adjusting knob 39 is now rotated, the distance scale 62 rotates while the clutch cylinder 53 and the adjusting screw 46 remain stationary and the images of the object remain coincident. The adjusting knob is rotated until the correct distance is indicated by the pointer 64. The pushbutton button 74 is then released, and the resilient hoop portion 77 moves the rib 76 out of engagement with the clutch cylinder. The distance scale will thereafter rotate with the adjusting screw and will provide an accurate distance readout.

Figure 13:
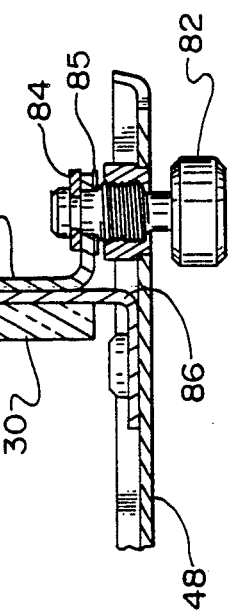
FIG. 13 is a sectional view taken along the line 13—13 of FIG. 8.

The theory of optical triangulation is well known, and it is believed that a detailed description of the manner in which the mirror 30 and beamsplitter 33 provide a double image to the eyepiece is unnecessary. The vertical inclination of the mirror 30 can be adjusted by an adjusting screw 82 (FIG. 13) which is threadedly engaged in the frame plate 48 and which extends through an L-bracket 83 which is secured to the support bracket 31 for the mirror 30. An E-ring 84 and washer 85 on the screw 82 maintain the position of the bracket 83 fixed relative to the screw. As the screw advances or retracts within the threaded opening in the frame plate 48, the mirror support bracket 31 and the mirror 30, pivot about the pivot point 86 of the bracket. The head of the adjusting screw 82 is positioned in an opening in the bottom housing so that the screw is accessible from the exterior of the housing (FIG. 6).

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:
1. A rangefinder comprising:
   a housing having an eyepiece,
   first and second spaced optical elements in the housing for projecting two images of a remote object into said eyepiece, the first optical element being mounted for movement relative to the second optical element to effect coincidence of said images at the eyepiece,
   adjusting means for moving the first optical element, the adjusting means including a shaft rotatably mounted in the housing,
   a scale mounted on the shaft for rotation therewith, the scale having indicia thereon representing distance,
   indicator means on the housing cooperating with the scale for indicating distance from the housing to said object when said two images are in coincidence at the eyepiece, a third optical element in the housing for projecting an image from a portion of the scale and the indicator means into said eyepiece whereby said portion of the scale and the indicator means can be viewed through said eyepiece simultaneously with said two images of said object, movable mounting means for mounting said first optical element for movement relative to the second optical element, said adjusting means including a contact portion movably mounted in the housing and engageable with the movable mounting means for causing movement thereof, and clutch means between said contact portion and said shaft, said clutch means normally connecting the contact portion and the shaft for rotating the contact portion when the shaft rotates but permitting the shaft to rotate independently of the contact portion when the clutch is operated whereby the scale can be rotated without rotating the contact portion.

2. The rangefinder of claim 1 in which said first optical element is pivotally mounted for rotation about a first axis and said shaft rotates about a second axis which is perpendicular to the first axis, said scale comprising a generally flat disc which extends perpendicularly to the second axis.

3. The rangefinder of claim 2 in which said disc is transparent, and a fourth optical element mounted in the housing for reflecting light through the disc and onto said third optical element.

4. The rangefinder of claim 3 in which the housing is provided with a window adjacent said fourth optical element for allowing light from outside of the housing to reach the fourth optical element.

5. The rangefinder of claim 1 in which said indicator means comprises a mark mounted on the housing adjacent the scale whereby the indicia on the scale move past the mark as the scale rotates.

6. The rangefinder of claim 1 in which said scale comprises a transparent flat disc which is mounted on the shaft.

7. The rangefinder of claim 1 in which the clutch means includes a cylindrical cup attached to the shaft, a cylindrical clutch positioned within the cup with an interference fit therebetween, and clutch-engaging means for engaging the clutch and overcoming the intereference fit.

8. The rangefinder of claim 7 in which the clutch-engaging means includes an actuating button which is accessible from the exterior of the housing.

9. The rangefinder of claim 7 in which the clutch-engaging means includes a rib portion which is engageable with the clutch, a resilient hoop portion which engages the housing for normally maintaining the rib out of engagement with the clutch, and an actuating portion which is accessible from the exterior of the housing and which is movable to move the rib portion into engagement with the clutch.

10. The rangefinder of claim 7 in which the contact portion of the adjusting means comprises a screw having a non-circular head which is received within a non circular bore in the cylindrical clutch, whereby the screw rotates with the clutch but may slide axially relative to the clutch, and a nut mounted on the housing and threadedly engaged with the screw.

* * * * *